(12) United States Patent
Vergnes et al.

(10) Patent No.: US 8,190,956 B2
(45) Date of Patent: May 29, 2012

(54) QUADRATURE DECODER FILTERING CIRCUITRY FOR MOTOR CONTROL

(75) Inventors: Alain Vergnes, Trets (FR); Renaud Tiennot, Aix en Provence (FR)

(73) Assignee: Atmel Corporation, San Jose, CA (US)

( * ) Notice: Subject to any disclaimer, the term of this patent is extended or adjusted under 35 U.S.C. 154(b) by 650 days.

(21) Appl. No.: 12/421,348

(22) Filed: Apr. 9, 2009

(65) Prior Publication Data
US 2010/0262880 A1 Oct. 14, 2010

(51) Int. Cl.
*G06F 11/00* (2006.01)
(52) U.S. Cl. ........................................ 714/746; 714/733
(58) Field of Classification Search .................. 714/746, 714/747, 723, 733, 734, 760, 791, 797, 48
See application file for complete search history.

(56) References Cited

U.S. PATENT DOCUMENTS

| 6,300,884 B1* | 10/2001 | Wilson .............................. 341/6 |
| 2010/0201350 A1* | 8/2010 | Egger et al. .................... 324/160 |
| 2010/0205488 A1* | 8/2010 | Sanduleanu et al. .......... 714/700 |

* cited by examiner

*Primary Examiner* — Dieu-Minh Le
(74) *Attorney, Agent, or Firm* — Fish & Richardson P.C.

(57) ABSTRACT

The disclosed quadrature decoder filtering circuitry for motor control uses one quadrature signal to correct an error in the other quadrature signal, thus allowing a noisy signal due to large dust particles or scratches to be recovered. In some implementations, a system processing for quadrature signals comprises a first circuitry triggered by edges of a first quadrature signal to detect inactivity of a second quadrature signal during consecutive edges of the first quadrature signal. A second circuitry is operable to count the number of consecutive edges of the first quadrature signal during inactivity of the second quadrature signal. A third circuitry is operable to combine transitions of the first quadrature signal with the second quadrature signal during a period of time determined by the count value of the second circuitry.

16 Claims, 6 Drawing Sheets

QUADRATURE DECODER FILTERING CIRCUITRY FOR MOTOR CONTROL

TECHNICAL FIELD

This subject matter is generally related to electronics, and more particularly to a quadrature decoder filtering circuitry for motor control.

BACKGROUND

A speed/rotation sensor of an electrical motor typically comprises an optical or magnetic disk mounted on the shaft of the motor. An optical disk contains a series of light reflective or magnetic bars that allows electrical pulses to be generated. Noise introduced by dust and scratches located on an optical disk of a speed sensor of a motor may create inaccurate processing by downstream circuitries, including but not limited to false direction detection that may lead to inaccuracy in system positioning and/or additional delay in positioning.

Small dust particles can produce small spurious pulses in the electrical pulses, which can be easily filtered using conventional filtering circuitry. Large dust particles and scratches, however, may produce spurious pulses having larger duration, which are more difficult to suppress using conventional filtering circuitry designed to filter small spurious pulses.

SUMMARY

The disclosed quadrature decoder filtering circuitry for motor control uses one quadrature signal to correct an error in the other quadrature signal, thus allowing a noisy signal to be recovered. In some implementations, a system processing for quadrature signals comprises a first circuitry triggered by edges of a first quadrature signal to detect inactivity of a second quadrature signal during consecutive edges of the first quadrature signal. A second circuitry is operable to count the number of consecutive edges of the first quadrature signal during inactivity of the second quadrature signal. A third circuitry is operable to combine transitions of the first quadrature signal with the second quadrature signal during a period of time determined by the count value of the second circuitry.

DETAILED DESCRIPTION

Figure 1:
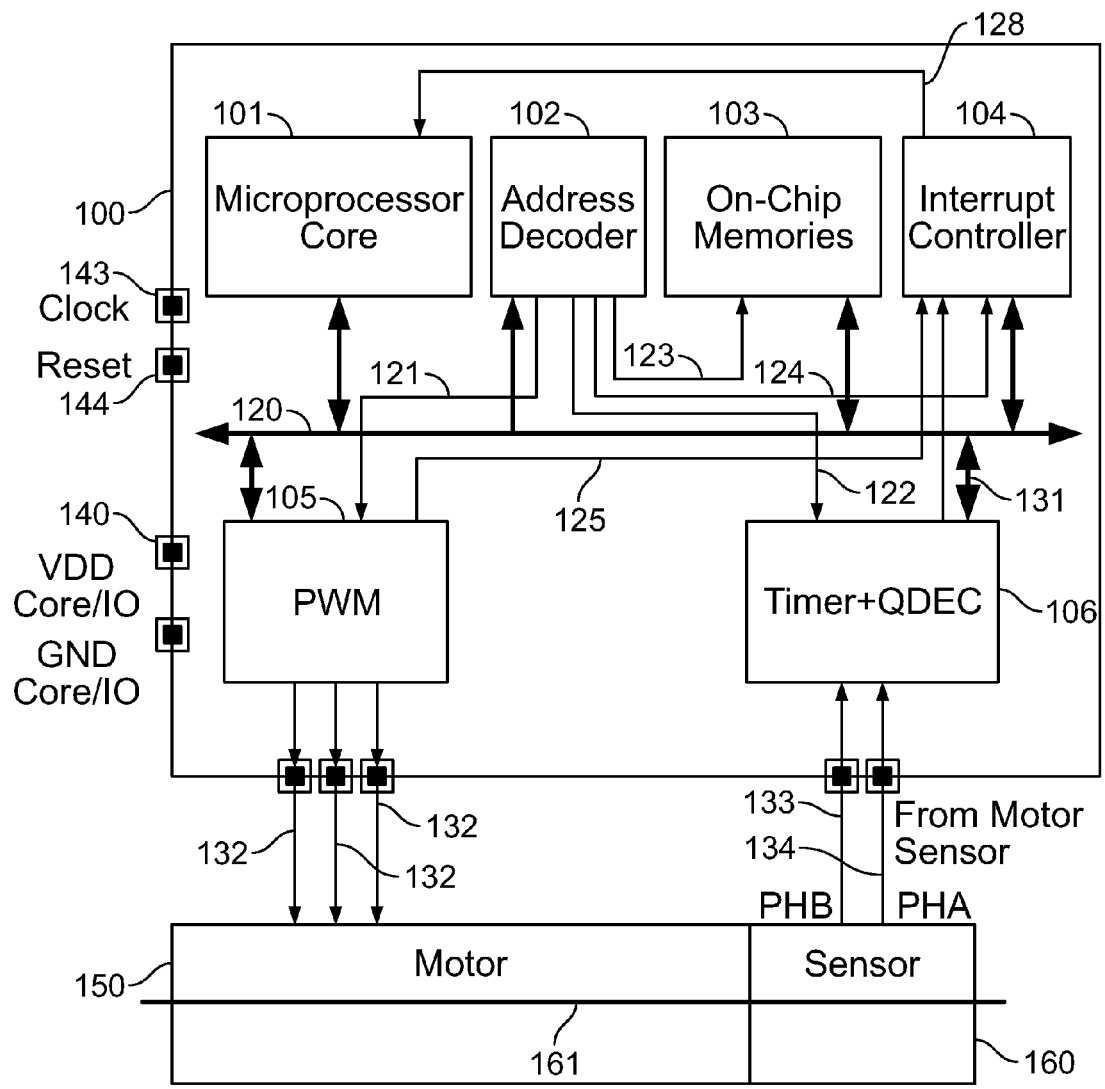
FIG. 1 is a block diagram of an example microcontroller with a quadrature decoder (QDEC) and a pulse width modulator (PWM) module connected as a peripheral of a microprocessor core located in the microcontroller.

FIG. 1 is a block diagram of an example microcontroller with a quadrature decoder (QDEC) and a pulse width modulator (PWM) module connected as a peripheral of a microprocessor core located in the microcontroller. In this example configuration the QDEC is included in a microcontroller. The QDEC, however, can be used in any type of integrated circuit (IC) device.

To control a motor (e.g., speed, position), a control application generates signals to create the rotation of the motor and receives and processes signals generated by a rotary sensor module mounted on the shaft of the motor. This rotary sensor produces electrical signals that enable the motor control logic circuitry to be aware of the rotation, speed and direction of the motor. This feedback circuitry allows operation of the motor in a closed loop system for accurate speed and positioning of the motor.

The feedback circuitry processing these signals is often a standard microcontroller. The microcontroller can include a peripheral module (e.g., a PWM module) to generate the signals used to operate rotation of the motor. The signals from the microcontroller can be amplified (e.g., voltage, current) by means of power transistors (e.g., MOSFET power transistors) or any other power transistors, prior to driving the coils of the motors. The signals generating the rotation are well known in the art and will not be discussed further in this document.

The feedback signals from the rotary sensor are usually not directly processed by the microprocessor module of the microcontroller but rather are processed by a peripheral module (e.g., a QDEC), which performs filtering and analysis. This method is generally the only way to process these signals in a real time manner without requiring too much power (e.g., very high clock frequency) for the microprocessor core. Increasing power by adding additional circuitry would make the bill of materials of the control application too expensive for volume production.

Referring to FIG. 1, the microcontroller 100 comprises a microprocessor 101 capable of accessing peripheral circuitries like PWM module 105 and "TIMER+QDEC" Quadrature Decoder 106. Data exchanges are performed by means of the system bus 120, which comprises (not shown) a read data bus carrying data from peripherals to microprocessor 101, a write data bus carrying data from microprocessor 101 to peripherals, an address bus and control signals to indicate transfer direction on system bus 120. Since the address bus of the system bus 120 is shared by all peripherals there is a need to decode the value carried on this bus to select one peripheral at a time. A circuitry 102 acts as an address decoder by receiving the address bus (part of system bus 120) and provides select signals 121, 122, 123, 124. Peripheral circuits 103, 104, 105, 106 read these select signals to take into account values carried on system bus 120.

On-chip memories 103 store the application software to be processed by microprocessor 101. The microcontroller 100 is powered by means of a different set of terminals 140. Terminals 140 comprise a series of physical access terminals (PADs) to power the microcontroller 100, some for providing VDD, some for providing GND. A user application runs software, which may be loaded within on-chip memories 103 during the startup of the microcontroller (boot section). The software located within on-chip memory 103 is fetched by microprocessor 101 by means of system bus 120. The on-chip memory 103 is selected (e.g., signal 123 is active) as soon as the address value of the address bus matches the address range allocated for the on-chip memory. The address decoder 102 is designed accordingly, the address range being hard-wired in the address decoder. As a response, the memory provides the corresponding data onto system bus 120 which is read by microprocessor 101 and processed accordingly.

The software may also be aware of the availability of a data through the interrupt signal 125. When set, this signal triggers interrupt module 104. Then the interrupt controller 104 signals the event directly to a dedicated pin of the microprocessor 101. A central interrupt module allows any number of interrupts to be handled by a single input pin on the microprocessor 101. When the microprocessor 101 is triggered by the interrupt signal, its internal state machine interrupts the processing of the current task and performs a read access on the interrupt controller 104 by means of system bus 120 to get the source (peripheral) of interrupt.

The microcontroller 100 supervises the control of an electrical motor 150. To get feedback information, a rotary sensor 160 is mounted on shaft 161. To create the rotation, the PWM module 105 generates a set of signals 132. The rotation is detected by rotary sensor 160, which creates electrical signals 133 and 134 according to the speed of the motor. The amplification of signals 132 in order to match the voltage requirements of the motor, and amplification of signals 133, 134 to adapt the microcontroller 100 voltage levels and the power supply circuitries of rotary sensor are well known and therefore not described in this document.

Several types of rotary sensors exist but they basically provide the same type of electrical signals. If only one signal is provided there is no way to determine the rotation direction. Some sensors provide two electrical signals aligned in quadrature. This quadrature alignment, after processing (decoding) provides the direction of rotation.

Figure 2:
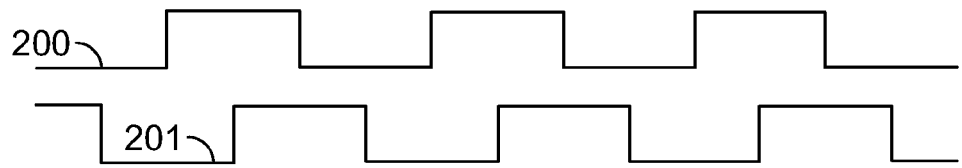
FIGS. 2 and 3 illustrate output waveforms of a rotary sensor aligned in quadrature.
Figure 3:
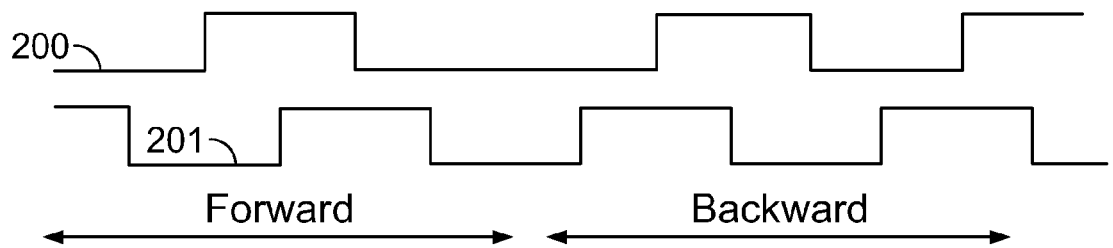

FIGS. 2 and 3 illustrate output waveforms 200, 201 of a rotary sensor aligned in quadrature. In this example, the output waveform 200 corresponds to the waveform of signal 133 of FIG. 1 and the output waveform 201 corresponds to the waveform of signal 134 of FIG. 1. Quadrature alignment allows easy detection of the direction of rotation using simple circuitry. Depending on the value sampled by the rising edge of signal 133 (waveform 200) on signal 134 (waveform 201) the rotation is determined. The rising edge of waveform 200 may capture either a logical "0" or "1" on signal 201. A direction change event can also be declared as soon as two consecutive edges on one of the quadrature signals occurs without any change on the other quadrature signal.

The waveforms 200, 201 shown in FIG. 3 can be easily determined when one knows how the sensor generating the waveforms 200, 201 is built. An optical disk is often mounted on the shaft of a motor. The optical disk contains a series of reflective bars. A Light Emitting Diode (LED) generates a light beam which bounces on the disk or not and is detected by a receiving diode circuitry (e.g., an amplifier, filter, level shifter) to provide the waveform 200. In a quadrature sensor interface, at least two series of reflective bars are printed in quadrature and two LED emitters/receivers are mounted to provide the quadrature waveforms 200, 201. The same result can be obtained by a series of holes within the disk, so that the light source is transmitted to the receiver or not, thus creating the same waveforms 200, 201 as reflective bars method.

The more bars on a disk, the more accuracy the sensor provides for rotation at lower speed. The speed can be calculated by differentiating the accumulated number of received pulses. A time base is generated, providing sampling points. For each sampling point, the counter is first stored in a register and then cleared; otherwise, the pulses are counted. The register contains an image of the speed of rotation. In practice, however, the optical disk may not be as clean. Dust particles and scratches may be located on the disk. Therefore, the output signal from the rotary sensor may be corrupted due to dust particles and scratches, which can cause spurious pulses in the signal generated by the rotary sensor. These spurious signals can be misread by downstream circuitry as, for example, a direction change in rotation of the motor shaft.

Figure 4:
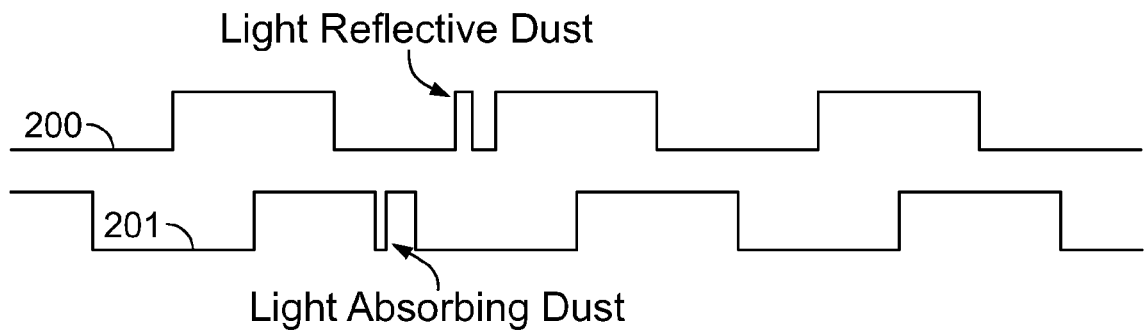
FIG. 4 illustrates spurious signals in sensor output waveforms due to light reflective and light absorbing dust.

FIG. 4 illustrates spurious pulses in sensor output waveforms 200, 201 due to light reflective and light absorbing dust. Depending on the nature of the dust, the light can be absorbed or reflected, resulting in a glitch in the waveforms 200, 201 that can be positive or negative.

Figure 5:
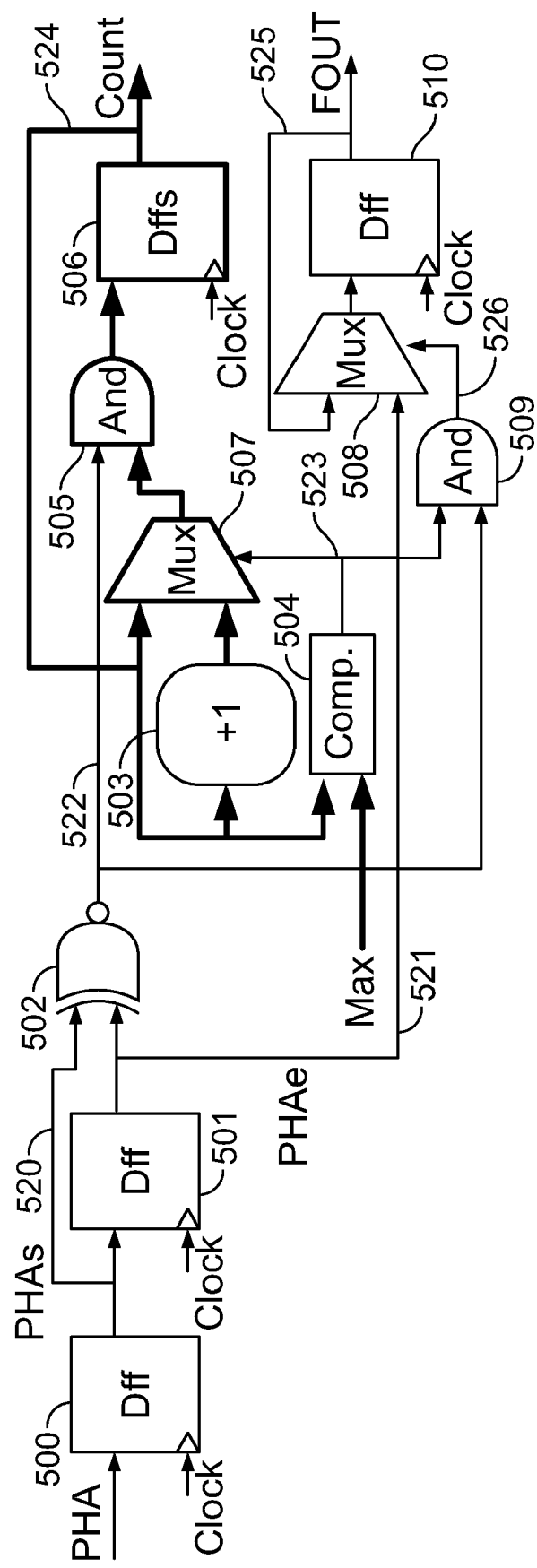
FIG. 5 is a schematic diagram of a circuit that overcomes spurious pulses resulting from dust or scratches located on an optical disk.

FIG. 5 is a schematic diagram of a circuit that overcomes spurious pulses resulting from dust or scratches located on an optical disk. Referring to the left-hand portion of the circuit, the PHA input signal is generated by the rotary sensor and is first sampled on the system clock ("Clock") signal of filtering synchronous logic. Because the PHA signal is asynchronous, a proper synchronization circuit can be a dual stage flip-flop (DFF). But for simplicity only one DFF 500 is described in the circuitry shown. The signal 520 ("PHA") is therefore synchronous of "Clock."

DFF 501 samples the signal 520 and both DFF 500 and DFF 501 outputs are compared by means of XNOR gate 502. The output 522 of XNOR gate 502 is high (logical "1") when there is no difference between the outputs 520 and 521. The output 522 drives a series of AND gates 505, where one input of each AND gate of the series is connected to output 522. As soon as output 522 is cleared, i.e., there is an edge on input PHA, the outputs of the series of AND gates 505 are cleared. Therefore, one "Clock" cycle later, the signal 524 "Count" has cleared its current value. When PHA input is stable, two "clock" cycles after output 522 is high (logical "0"), the series of AND gates 505 acts as transparent cells because 1 AND X results in X (X representing logical 1 or 0).

Signal 524 feeds incrementor 503, comparator 504 and a series of 2 to 1 multiplexers 507. The incrementor 503 provides on its output the input value +1. The current value 524 is compared with a maximum value "max" which can be driven by a configuration register accessible from a software user interface. This value modifies the filtering feature of the circuitry. For simplicity, we will assume a constant value of 4. Just after being cleared, the value 524 is lower than 4, as a consequence the signal 523 is cleared and multiplexers 507 copy, respectively, on their outputs, their inputs driven by the output of incrementor 503, so 1 is loaded on outputs of "Count signal 524. And so on up to 4. When 524 reaches 4, the output of the comparator 504 is set and multiplexers 507 copy, respectively, on their outputs, their inputs driven by signal 524, the "count" value is held.

The output of comparator 504 is also driving two-input AND gate 509. The second input is driven by output 522. If the "count" value is 4 and "PHA" input is stable, true when output 522 is set, the output of AND gate 509 is high. When high, the 2 to 1 multiplexer 508 copies signal 521 on its output, therefore DFF 510 loads an image of the input value "PHA" on signal 525; otherwise, DFF 510 and multiplexer 508 re-circulates the data 525. Both cells (multiplexer 509 and DFF 510) constitute a sample and hold function. As a consequence, if "PHA" is not stable for more than 4 clock cycles, "PHA" is not copied on output 525. The filter circuitry described in FIG. 5 delays the output by 4 clock cycles compared to the input PHA.

Figure 6:
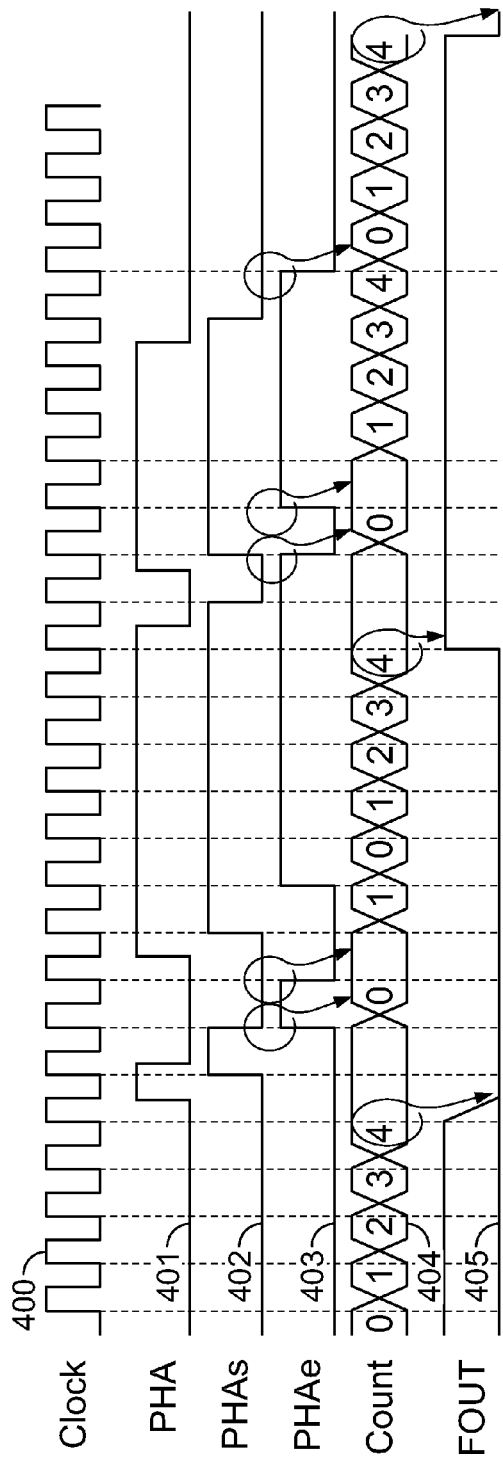
FIG. 6 illustrates the waveforms of the circuitry of FIG. 5.

FIG. 6 illustrates the waveforms of the circuitry of FIG. 5. The circuitry shown in FIG. 5 can be found on many existing integrated circuits because it prevents false detection of direction changes in rotation. A spurious pulse locally looks like a direction change (refer to FIG. 4). If this circuitry is efficiently filtering spurious pulses introduced by dusts located on the disk, the circuitry cannot efficiently filter the noise introduced by large dust particles or scratches because a scratch may cover several reflective bars. If the filtering capability (e.g., the "max" value of the circuitry of FIG. 5) is increased, then correct pulses from the reflective bars may be filtered, resulting in no rotation detection. So another technique and circuitry is needed for large dust particles and scratches. Such circuitry can be located downstream compared to the previously described filtering circuitry shown in FIG. 5.

Figure 7:
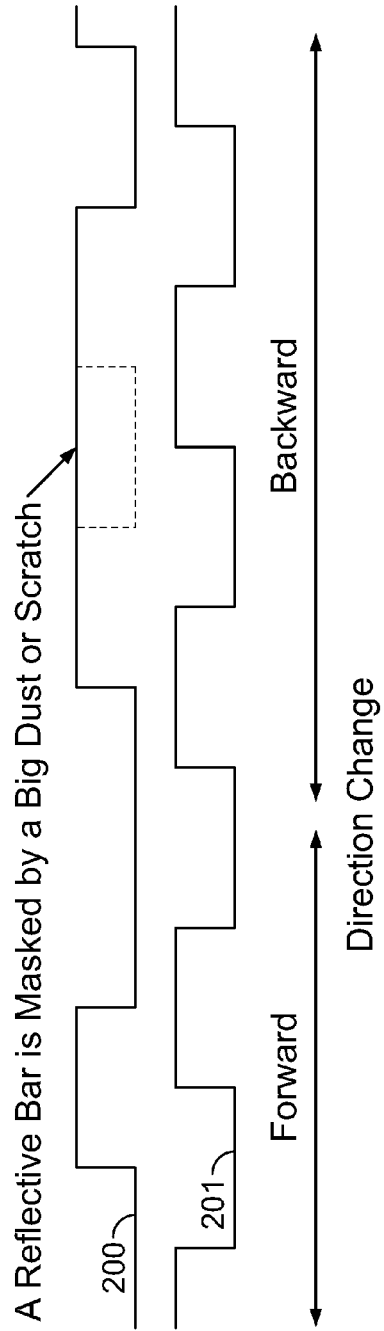
FIG. 7 illustrates the waveforms generated by a rotary sensor, which show a change in rotation followed by a quadrature signal error due to dust that masks a reflective bar.

FIG. 7 shows a change in rotation followed by a quadrature signal error due to dust that masks a reflective bar. Even if there is a condition of change at the time the quadrature error occurs (e.g., two edges of one signal while the other remains at the same logical value), one can see that there is no change in the quadrature signals alignment just before and just after the dust masking (e.g., the rising edge of signal 200 samples a logical '1' on 201 just before the dust masking but also just after). Thus declaring a rotation change when the quadrature error occurs may lead to unpredictable behavior of the logic downstream. Of course this situation can be also found without any dust or scratch, if the motor is started in one direction then stopped, direction reverted for one reflective bar, then reverted again and so on. But it is unlikely to occur for a normal mode of operation, especially when the motor is powered in one direction for several rounds or several seconds (e.g., hundreds or thousands of rounds).

The method and circuitry described below in reference to FIGS. 8 and 9 detects errors in a quadrature signal, and corrects missing pulses in the quadrature signal. The method is based on consecutive edges counting on one quadrature signal while the other quadrature signal is constant. The determination of direction change or a missing pulse will depend on events of the constant signal and count value (odd, even). The correction of missing pulses will also depend on count value. To calculate speed and position, the edges of signals 200 and 201 are counted.

Figure 8:
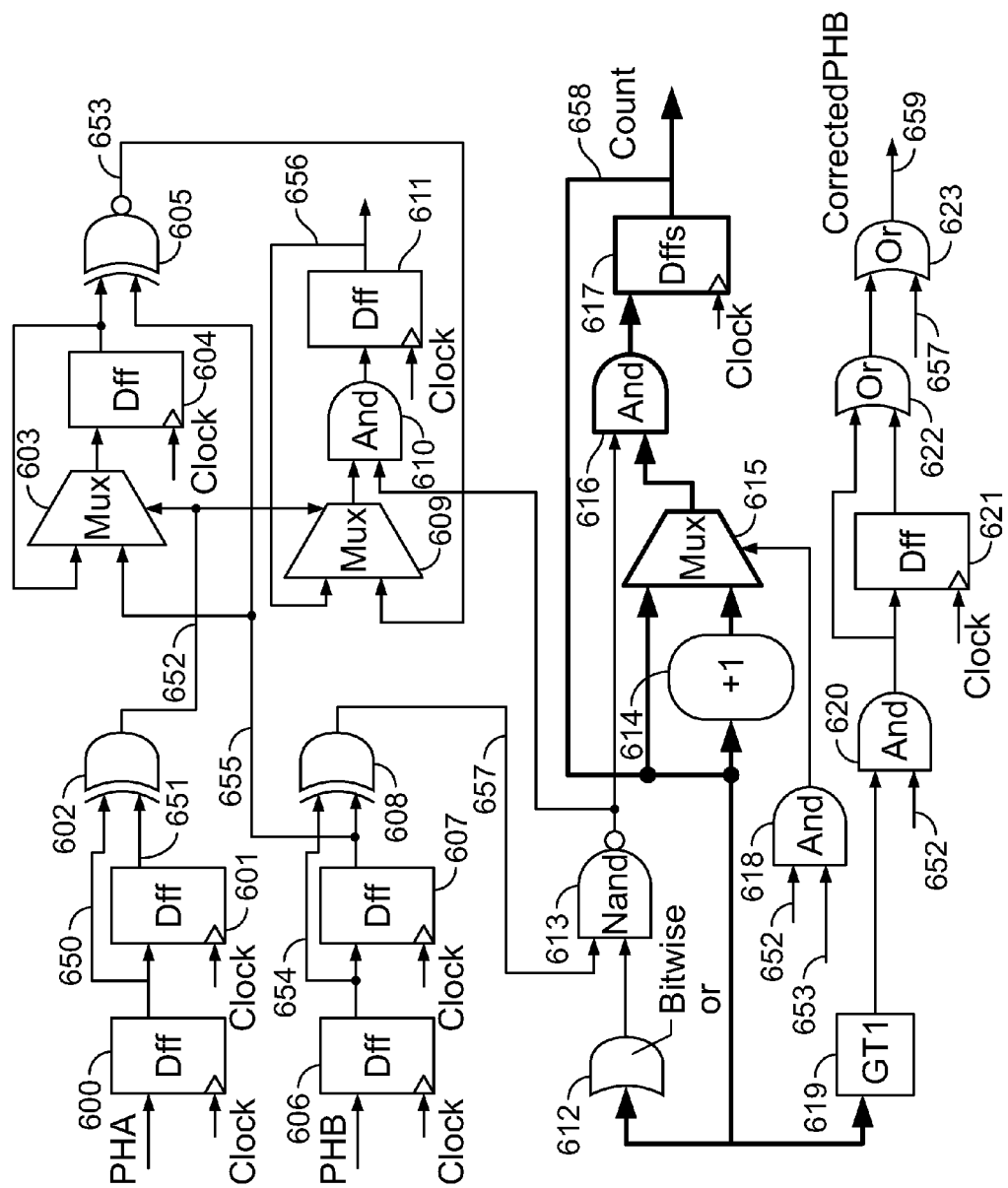
FIG. 8 is schematic diagram of example quadrature decoder filter circuitry for detecting errors in a quadrature signal, and for correcting missing pulses in the quadrature signal.

FIG. 8 is schematic diagram of example quadrature decoder filter circuitry for detecting errors in a quadrature signal, and for correcting missing pulses in the quadrature signal. The circuitry of FIG. 8 can be connected downstream to the filtering circuitry described in FIG. 5 or coupled directly to rotary sensor outputs. For simplicity, FIG. 8 shows the circuitry coupled directly to rotary sensor outputs (PHA, PHB). FIG. 8 describes circuitry to detect and correct a missing pulse on PHB using an edge of PHA. The same circuit can be used for detecting and correcting a missing pulse on PHA using an edge of PHB. Part of the logic can be shared between these two circuitries. In practice the circuitry shown in FIG. 8 can be duplicated to process the input signal PHA in the same manner as input signal PHB is processed, as described below.

Figure 9:
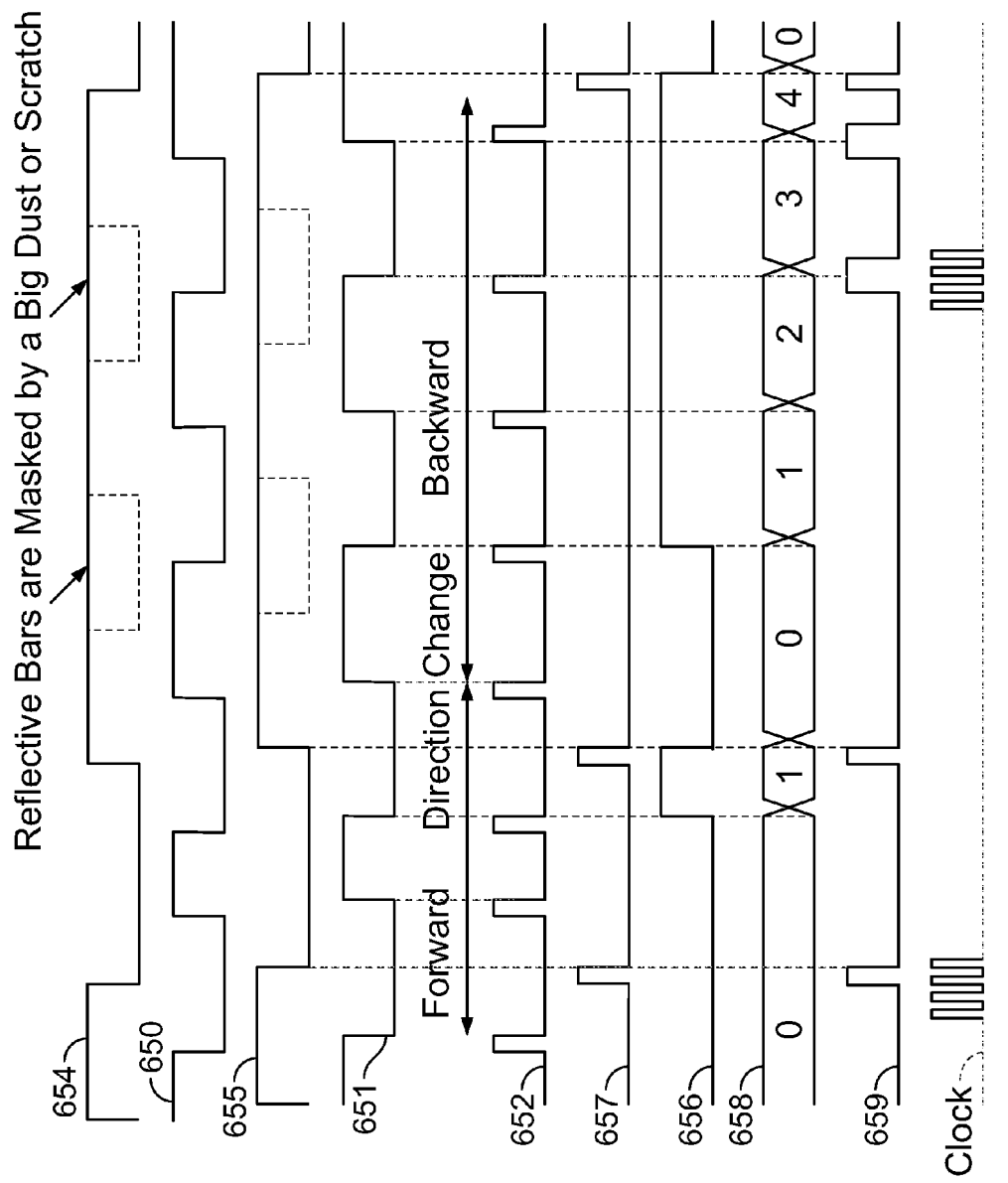
FIG. 9 is illustrates the waveforms of the circuitry of FIG. 8.

Referring now to FIG. 8 with reference to the waveforms of FIG. 9, because the signals PHA and PHB are asynchronous to the synchronous logic system clock ("clock"), the signals PHA and PHB are first sampled using, respectively, DFF 600 and DFF 606. To detect the rising or falling edges in a synchronous way, the outputs of DFF 600 and DFF 606 are sampled again using respectively DFF 601 and DFF 607. When the input PHA switches from 0 to 1 or 1 to 0, the output value of DFF 600 differs from output value of DFF 601 for one clock cycle. This difference is detected by means of XOR gate 602 generating a logical "1" on signal 652 each time a difference occurs between DFF 600 and DFF 601. The same structure is located on PHB path, with XOR gate 608 generating a logical "1" on signal 657, so that a difference exists between the output of DFF 606 and the output of DFF 607. A difference is detected as soon as a rising edge or a falling edge occurs on PHA or PHB. Therefore, cells 601 and 602 act as an edge detector for input PHA and cells 607 and 608 act as an edge detector for input PHB.

Let's now assume there is a direction change in rotation and two consecutive edges of PHA occurs without any change on PHB. The edge detection of PHA, signal 652, drives the select input of 2 to 1 multiplexer 603 so that when there is an edge detected on PHA (signal 652 is high), the multiplexer 603 selects the input driven by signal 655. Signal 655 is an image of PHB input. When there is no more edge on PHA, two clock cycles later the signal 652 is cleared and multiplexor 603 selects the input driven by the output of DFF 604. Therefore, DFF 604 stores the value of PHB when an edge occurs on PHA. So for any PHA edge, the value of PHB during the previous PHA edge is available by reading DFF 604 output. A matching circuit, for example, XNOR gate 605 receives output of DFF 604 and signal 655 (image of PHB) and drives a 1 on signal 653 when both inputs are equal. This is the case when two consecutive edges of PHA samples the same value on PHB, so when a possible direction change occurred. Signal 653 also drives two-input AND gate 618. The other input is driven by signal 652, which corresponds to the detection of any PHA edge. The output of the AND gate is set when there are two consecutive edges of PHA sampling the same value on PHB. This result drives a series of multiplexers 615 which select the output of incrementor 614 when output of AND gate 618 is high. When the AND gate 618 output is 0, the set of multiplexers 615 copy the other input driven by the output of DFF 617, thus re-circulating the data (hold function), if the set of AND gate 616 acts as transparent (e.g., the output of two-input NAND gate 613 is high). The incrementor 614 is driven by the output of the series of DFF 617. Therefore if DFF 617 is carrying 0, incrementor output will be 1, and this value will be loaded by DFF 617 because NAND gate 613 is driven by the output of bit wise OR gate 612. The bit wise OR gate 612 receives all outputs of the set of DFF 617 and makes an OR between all these bits resulting in logical "1" on its output when signal 658 differs from 0. When 0, the NAND gate 613 drives a 1 on its output. Therefore, the set of AND gate is transparent and signal 658 is incremented. So cells 614 to 617 form a counter that counts the number of times two consecutive edges on PHA samples the same data on PHB.

The direction change detection logic (not shown) does not declare a change direction at this time (when signal 658 changes from 0 to 1). When signal 658 is 1, if an edge occurs on PHB, the signal 657 is set and bitwise OR gate 612 is 1 because signal 658 differs from 0 (the LSB of signal 658 is set); therefore NAND gate 613 output is 0. This value clears the outputs of AND gates 616, therefore clearing the DFF 617 output and signal 658. The direction change detection logic (not shown) can declare a direction change by using the output of NAND 613 (e.g., signal 658 equals 1 and output of NAND 613 is 1).

Let's now assume, there is a scratch or big dust on PHB reflective bars of the optical disk on signal 654. There are missing pulses on signal 657 due to this noise. Therefore, the counter made of cells 614 to 617 counts up to the next edge of PHB as described in reference to the previous figures. When the counter increments from 1 to 2 (refer to waveforms on FIG. 9), there is an edge on PHA but at this time the output of comparator 619 is 0 because signal 658 is still 1 (just switching to 2). Comparator 619 drives a 1 on its output when the value of signal 658 is strictly greater than 1. When signal 658 is 2 and edge occurs again on PHA, then there is a quadrature error and direction change is not the root cause; therefore there is a missing pulse and no edge can be detected without correction. When signal 658 is 2 and an edge occurs on PHA, signal 652 is set, therefore two-input AND gate 620 drives a 1 on input of DFF 621 and also two-input OR gate 622. The output of OR gate 622 is high. Therefore, a 1 is propagated to output 659 through two-input OR gate 623. If synchronous counter logic is placed downstream signal 659, it will increment by one whereas PHB input has no edge. Correction is active but since a complete pulse was lost, 2 edges are missing. The edge on PHA results on a 1-clock cycle pulse on signal 652. This is sampled by DFF 621 and its output is high the next clock cycle and for 1 clock cycle. The DFF 621 driving the output of OR gate 622, there is a 1 on this output for one more clock cycle, therefore propagating to output signal 659. Then for each missing pulse on PHB, any pulse on PHA creates a two-clock cycle pulse duration on signal 659. Therefore, if downstream logic is a synchronous counter it will increment by two, which corrects the missing edge of PHB.

Depending on the counter value one can also determine if the direction change occurred at the time missing edges are detected. If the counter value 658 is odd and there is an edge detected on signal 654 (e.g., signal 657 equals 1) then we have also a direction change. If the counter value is even, then only missing edges are detected and also corrected.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A system for detecting errors in a quadrature signal, comprising:
   a first circuitry operable to be triggered by edges of a first quadrature signal to detect inactivity of a second quadrature signal during consecutive edges of the first quadrature signal;
   a second circuitry coupled to the first circuitry, the second circuitry operable to count the number of consecutive edges of the first quadrature signal during inactivity of the second quadrature signal; and
   a third circuitry coupled to the first circuitry and the second circuitry, the third circuitry operable to correct errors in the second quadrature signal by combining transitions of the first quadrature signal with the second quadrature signal during a period of time determined by the count value of the second circuitry.

2. The system according to claim 1, where a quadrature signals phase change is determined according to the count value of the second circuitry.

3. The system of claim 1, where output of the third circuitry is accumulated or differentiated over time by means of one or more logic counters.

4. The system of claim 1, where the system is integrated with timer logic and connected as front-end logic of the timer logic.

5. The system of claim 1, where the system is embedded in a microcontroller.

6. The system of claim 5, where the count value processed by the second circuitry can be read through a software user interface of the microcontroller.

7. The system of claim 5, where the count value processed by the second circuitry can generate an interrupt signal sent to a microprocessor core of the microcontroller if the count exceeds a value configured by a user.

8. The system of claim 7, where the count value is processed by the second circuitry and generates an interrupt signal sent to the microprocessor core of the microcontroller if the count exceeds a predefined value.

9. A system for detecting errors in quadrature signals used for motor control, comprising:
   an edge detection circuit operable for detecting edges of first and second quadrature signals, where the first and second quadrature signals are indicative of a direction of rotation of a motor shaft;
   a sample and hold circuit coupled to the edge detection circuit, the sample and hold circuit operable for sampling the first quadrature signal at any edge of the second quadrature signal to provide a first quadrature signal value sampled on a previous edge;
   a matching circuit coupled to the first sample and hold circuit, the match circuit operable for comparing the first quadrature signal value sampled on the previous edge with the value of the first quadrature signal at a current edge of the second quadrature signal to determine if they match;
   an event detection circuit coupled to the matching circuit, the event detection circuit operable for generating a signal indicative of a possible direction change of rotation of the motor shaft if the matching circuit signals a match;
   a counter circuit coupled to the event detection circuit, the counter circuit operable for generating a count, the count for determining if the second quadrature signal includes noise due to contamination of a disk coupled to the motor shaft used to generate the second quadrature signal, and if a contamination is determined to have occurred, the counter circuit is further operable to count a number of missing edges of the second quadrature signal due to the contamination of the disk; and
   a correction circuit coupled to the counter circuit, the correction circuit operable for correcting for missing edges in the second quadrature signal.

10. The system of claim 9, where the determining if the second quadrature signal includes noise further comprises determining if the count of the counter is greater than one, and if the count is greater than one, generating a signal indicating that a contamination of the disk has occurred.

11. The system of claim 10, where the correction circuit is operable for correcting for missing edges in the second quadrature signal in response to receiving the signal indicating that a contamination of the disk has occurred.

12. The system of claim 11, where correcting for missing edges further comprises adding the number of missing pulses to the second quadrature signal.

13. A method of detecting errors in quadrature signals, comprising:
   detecting edges of first and second quadrature signals, where the quadrature signals are indicative of a direction of rotation of a motor shaft;

sampling the first quadrature signal at any edge of the second quadrature signal to provide a first quadrature signal value sampled on a previous edge of the second quadrature signal;

comparing the first quadrature signal value sampled on the previous edge with the value of the first quadrature signal at a current edge of the second quadrature signal to determine if they match;

generating a signal indicative of a possible direction change of rotation of the motor shaft if the matching circuit signals a match;

determining if the second quadrature signal includes noise due to contamination of a disk coupled to the motor shaft used to generate the second quadrature signal, and if a contamination is determined to have occurred, counting a number of missing edges of the second quadrature signal due to the contamination of the disk; and correcting for the missing edges in the second quadrature signal.

14. The method of claim 13, further comprising:
determining if the count of the counter is greater than one; and
if the count is greater then one,
    generating a signal indicating that a contamination of the disk has occurred.

15. The method of claim 14, further comprising:
correcting for missing edges in the second quadrature signal in response to receiving the signal indicating that a contamination of the disk has occurred.

16. The method of claim 15, where correcting for missing edges further comprises:
adding the number of missing pulses to the second quadrature signal.

\* \* \* \* \*